10/22/85 XR 4,548,299

United States Patent [19]

Nomura

[11] Patent Number: 4,548,299

[45] Date of Patent: Oct. 22, 1985

[54] AC ELEVATOR CONTROL SYSTEM

[75] Inventor: Masami Nomura, Nagoya, Japan

[73] Assignee: Mitsubishi Denki Kabushiki Kaisha, Tokyo, Japan

[21] Appl. No.: 486,970

[22] Filed: Apr. 20, 1983

[30] Foreign Application Priority Data

Apr. 20, 1982 [JP] Japan ........ 57-65846

[51] Int. Cl.[4] ........ B66B 5/00; H02J 9/04

[52] U.S. Cl. ........ 187/29 R; 318/741; 318/744; 318/757; 318/759; 307/64; 307/66

[58] Field of Search ........ 187/29 R, 29; 318/741, 318/744, 751, 759; 307/63, 64, 66, 73

[56] References Cited

U.S. PATENT DOCUMENTS

| | | | |
|---|---|---|---|
| 3,863,123 | 1/1975 | Godard | 307/64 X |
| 3,902,573 | 9/1975 | Grove | 187/29 R |
| 3,916,279 | 10/1975 | Kawano et al. | 318/432 X |
| 4,122,516 | 10/1978 | Tokunaga | 307/64 X |
| 4,376,471 | 3/1983 | Uchino et al. | 187/29 |

FOREIGN PATENT DOCUMENTS

| | | | |
|---|---|---|---|
| 0147352 | 12/1978 | Japan | 187/29 R |
| 57-33174 | 2/1982 | Japan . | |
| 2103437 | 2/1983 | United Kingdom | 187/29 |
| 2103440 | 2/1983 | United Kingdom | 187/29 |
| 2106730 | 4/1983 | United Kingdom | 187/29 R |
| 2110487 | 6/1983 | United Kingdom | 187/29 R |

OTHER PUBLICATIONS

"Spotlight Report", by Mitsubishi Electric Advance, Japan (vol. 14, Dec. 1980).

*Primary Examiner*—William M. Shoop, Jr.
*Assistant Examiner*—Shik Luen Paul
*Attorney, Agent, or Firm*—Wenderoth, Lind & Ponack

[57] ABSTRACT

An AC elevator control system has a converter for converting a three-phase AC power to a direct current, an inverter for inverting the direct current to a three-phase AC power with a variable voltage at a variable frequency, and a three-phase induction motor for receiving the last-mentioned AC power to operate an elevator car connected to a counterweight through a traction rope trained over a sheave. A battery connected across the DC side of the inverter is enabled upon the occurrence of a power failure or a fault. A command emergency frequency generator responds to the occurrence of an emergency such as a power failure to deliver to the inverter a low frequency emergency frequency as determined by the relationship between a difference in weight between the elevator car and the counterweight and various losses of a motor driving system so as to cause the induction motor not to generate regenerative power.

4 Claims, 7 Drawing Figures

AC ELEVATOR CONTROL SYSTEM

BACKGROUND OF THE INVENTION

This invention relates to improvements in an AC elevator control system.

There are known AC elevator control systems of the type comprising a converter for converting a three-phase electric power to a direct current, an inverter including a plurality of inverting elements to invert the direct current from the converter to a three-phase electric power with a variable voltage at a variable frequency and a three-phase induction motor receiving the three-phase electric power from the inverter to drive an associated elevator car with a rotational speed thereof controlled. Upon the occurrence of a power failure or a fault, a battery connected across the DC side of the inverter takes over the direct current from the converter and the induction motor is put in the regenerative mode of operation. Thus a regenerative electric power is produced on the DC side of the inverter. In order to return that regenerative power back to the AC side of the converter a regenerative inverter has been connected across the converter.

When a voltage on the DC side of the inverter rises in the regenerative mode of operation, selected ones of the inverting elements of the inverter have been switched to supply a direct current to the induction motor. Thus a DC braking action is exerted on the motor to cause the elevator car to travel at a constant speed. Under these circumstances the induction motor has been rotated at such a rotational speed that a braking torque of the induction motor is balanced with an unbalanced load torque resulting from a difference in weight between the elevator car and a counter weight connected the car through a traction rope. That rotational speed has been unstable and therefore, in order to stabilize the rotational speed, an emergency speed instructing device has compared a command emergency speed signal from a command emergency speed generator with an actual speed signal for the elevator car delivered from a tachometer generator connected to the induction motor to supply a command speed signal to the inverter to effect the feedback control of the motor's speed.

Therefore the abovementioned type of conventional AC elevator control systems has been disadvantageous in that the resulting apparatus is not only expensive but also an operating device enabled upon the occurrence of an emergency is complicated and the reliability thereof is not sufficiently satisfied.

Accordingly, it is an object of the present invention to provide a new and improved AC elevator control system ensuring that an associated elevator car can be operated with a cheap structure and through the simple control upon the occurrence of a power failure or a fault by controlling an inverter involved to generate a low frequency to lower a heavier one of the elevator car and an associated counter weight at a low speed.

SUMMARY OF THE INVENTION

The present invention provides an AC elevator control system comprising an elevator car and a counter weight connected to both ends of a traction rope respectively, a sheave over which the traction rope is trained, an induction motor for driving the sheave, a converter for converting an AC power to a direct current, an inverter for inverting the direct current from the converter to an AC power with a variable voltage at a variable frequency to supply the AC power to the induction motor, a battery connected across the DC side of the inverter and forming an electric source for actuating the inverter upon the occurrence of a power failure or a fault, and a command emergency frequency generator responsive to the occurrence of a power failure or a fault to deliver to the inverter a command emergency frequency signal to drive the inverter at a low frequency as predetermined by the command emergency frequency signal.

In a preferred embodiment of the present invention the command emergency frequency generator may include a pulse oscillator for generating a train of pulses having a constant pulse repetition frequency, a counter applied with the train of pulses from the pulse oscillator and a count direction changing signal to pulse modulate the pulses applied thereto, a decoder connected to the counter, and a plurality of "OR" gates connected to the decoder.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
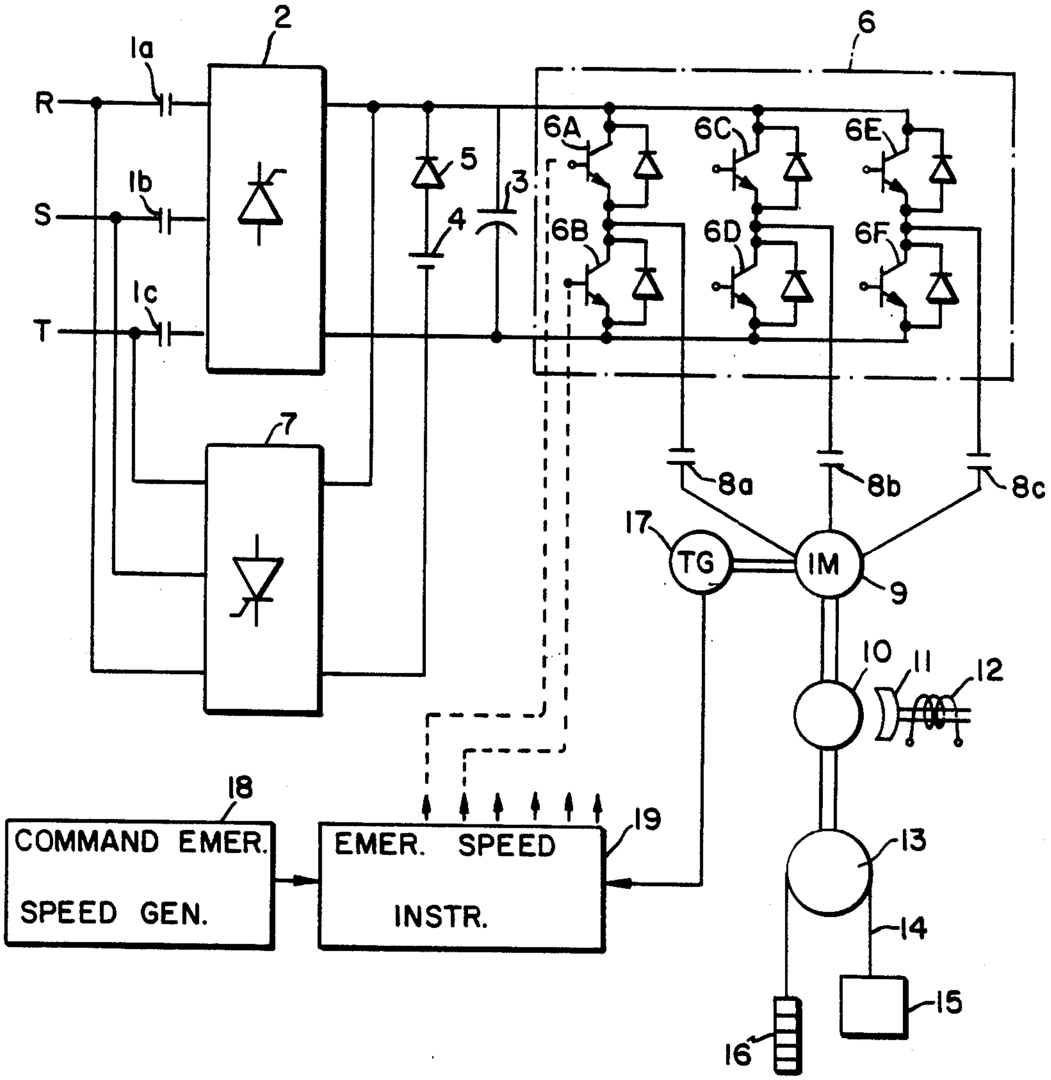
FIG. 1. (PRIOR ART)
FIG. 1 is a combined circuit and block diagram of a conventional AC elevator control system.

Referring now to FIG. 1 of the drawings, there is illustrated a conventional AC elevator control system. The arrangement illustrated comprises a three-phase AC source having three-phases R, S and T connected to respective pairs of contact 1*a*, 1*b* and 1*c* of an operating electromagnetic switch subsequently connected to a converter 2 for converting a three-phase electric power from the AC source R-S-T to a direct current. The pairs of contacts 1*a*, 1*b* and 1*c* are arranged to be closed upon the start of an associated elevator car and opened after the stoppage thereof, and the converter 2 converts an AC electric power to a DC electric power. The converter 2 includes the DC side connected across a smoothing capacitor 3 connected across a series combination of a battery 4 and a semiconductor diode 5. The battery 4 is connected at the negative end to one end of the DC side of the converter 2 and the diode 5 is connected via the cathode electrode to the other end of the DC side thereof. The capacitor 3 is connected across a pair of inputs to a pulse-width modulation type inverter generally designated by the reference numeral 6 and well known in the art. The inverter 6 includes six inverter elements, in this case, six NPN transistors interconnected on such a manner that three pairs of serially connected transistors 6A and 6B, 6C and 6D and 6E and 6F are connected across the pair of inputs or the DC side of the inverter 6. More specifically, one of the serially connected transistors 6B, 6D or 6F includes an emitter electrode connected to the one end of the DC side of the inverter 6 and a collector electrode connected to an emitter electrode of the other transistor 6A, 6C or 6E including a collector electrode connected to the other end of the DC side thereof. Also each of the transistors has the emitter and collector electrodes connected to an anode and a cathode electrode of a semiconductor diode respectively. The inverter 6 is operative to invert the direct current with a constant voltage from the converter 2 to a three-phase AC power at with a variable voltage at a variable frequency as will be described in more detail hereinafter.

As shown in FIG. 1 a regenerative inverter 7 includes an input connected to the DC side of the converter 2 and an output connected to the AC source R-S-T to return a regenerated DC power back to the AC source R-S-T.

The junction of the serially connected transistors in each pair is connected via a pair of contacts 8*a*, 8*b* or 8*c* of the operating electromagnetic switch to a three-phase induction motor 9. The pairs of contacts 8*a*, 8*b* and 8*c* are arranged be closed following the closures of the pairs of contacts 1*a*, 1*b* and 1*c* and opened simultaneously with the opening of the latter.

The induction motor 9 is mechanically coupled to a brake wheel 10 having an outer periphery opposite to a brake shoe 11 loaded with a spring (not shown). The brake shoe 11 is caused normally to push against the brake wheel 10 by means of the action of the spring to apply a braking force to the brake wheel 10. The brake shoe 11 is also electromagnetically coupled to a brake coil 12. When energized, the brake coil 12 is operative to move the brake shoe 11 away from the brake wheel 10 against the action of the spring.

The arrangement comprises further an elevator system including a hoist shieve 13 driven by the three-phase induction motor 9, a traction rope 14 trained over the shieve 14, an elevator car 15 connected to one end of the traction rope 14 and a counter weight 16 connected to the other end of the traction rope 14.

As shown in FIG. 1, a tachometer generator 17 is directly connected to the induction motor 9 to sense a rotational speed thereof and therefore the actual speed of the elevator car. Also a command emergency speed generator 18 is connected to an emergency speed instructing device 19 to which the tachometer generator 17 is also connected. The emergency speed instructing device 19 includes a set of outputs connected to base electrodes of all the transistors disposed in the inverter 6 respectively. Thus the emergency speed instructing device 19 receives both the actual speed signal for the elevator car 15 from the tachometer generator 17 and a command emergency speed signal from the command emergency speed generator 18 to supply a command braking signal to the inverter 6.

During the stoppage of the elevator car 15, the brake shoes 11 continues to push against the brake wheel 10 by means of the action of the spring as described above. Upon the elevator car 15 receiving a command starting signal, the pairs of contacts 1*a*, 1*b* and 1*c* of the operating electromagnetic switch are closed to permit the converter 2 to generate a DC output which is, in turn, smoothed by the smoothing capacitor 3 and then applied to the inverter 6. In the converter 6 the transistors 6A through 6B are controlled by a speed control device (not shown) well known in the art and a three-phase AC power is generated which power has a variable voltage and a variable frequency in a phase sequence in accordance with a direction of travel of the elevator car 15. Then the pairs of contacts 8*a*, 8*b* and 8*c* of the operating electromagnetic switch are closed to cause the AC power to be supplied to the induction motor 9. Simultaneously the brake coil 12 is energized to disengage the brake shoe 11 from the brake wheel 10. Thus the induction motor 9 is started in a direction of rotation as determined by the phase sequence in which the three-phase output from the converter 6 is supplied to the motor 9. This results in the initiation of travel of the elevator car 15. Then the speed control device as described above is operated to adjust the output voltage and frequency from the inverter 6 to control the rotational speed of the induction motor 9 and therefore a speed of travel of the elevator car 15.

When the elevator car 15 approaches a floor of a building served therewith at which the elevator car 15 is predetermined to be stopped, the same is decelerated until it is stopped at that floor. At that time, the pairs of contacts 8*a*, 8*b* and 8*c* are opened to disconnect the induction motor 9 from the inverter 6. At the same time, the brake coil 12 is deenergized to cause the brake shoe 11 to push against the brake wheel 10 by means of the action of its spring and also the pairs of contacts 1*a*, 1*b* and 1*c* are opened.

During the travel of the elevator car 15, a power failure or a fault may occur so that the elevator car 15 may be stopped between a pair of adjacent floors of the building. At that time an electric power from the battery 4 is supplied to the inverter 6 through the diode 5. On the other hand a load within the elevator car 15 is sensed by a load sensor (not shown) well known in the art to cause a combination of the elevator car 15 and the counter weight 16 to travel in a down direction with the inductor motor operated in the regenerative mode. The term "down direction" means a direction which heavier one of the elevator car 15 and the counter weight 16 descends. At that time the induction motor 9 is operated in the regenerative mode as described above and a mechanical energy is returned back to the DC side of the inverter 6 therethrough. Then the regenerative inverter 7 is operated to return that regenerated power to the AC side of the converter 2 or the AC source R-S-T to protect the inverter 6.

During the occurrence of a power failure or a fault on the regenerative inverter 7, however, the abovementioned energy is accumulated on the smoothing capacitor 3 to raise a voltage on the DC side of the inverter 6. This may result in a fear that the transistors 6A through 6F in the inverter are broken.

Thus if the voltage on the DC side rises in the regenerative mode of operation of the induction motor 9 then specified ones of the transistors 6A through 6F, for example, the transistors 6A and 6D are switched to flow the induction motor 9 with a direct current to exert a DC braking force on the induction motor to 9 thereby to cause the elevator car 15 to travel at a constant speed.

Figure 2:
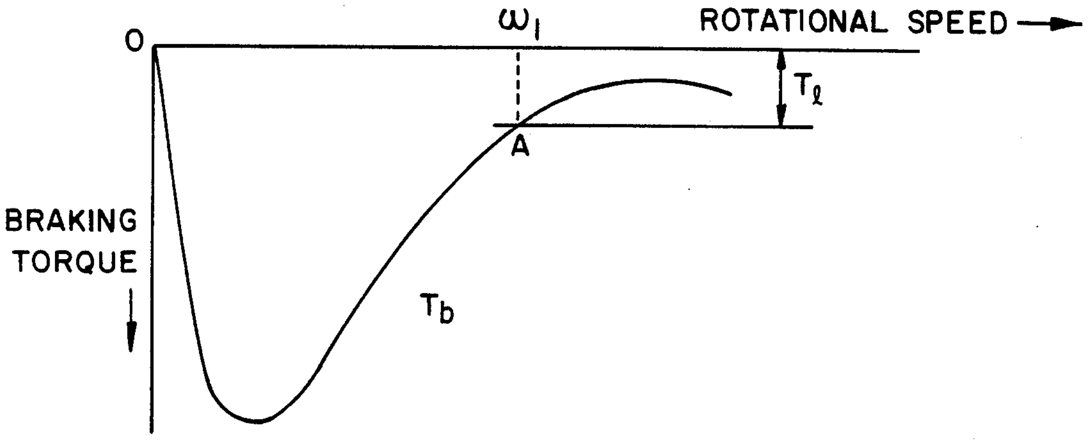
FIG. 2. (PRIOR ART)
FIG. 2 is a graph illustrating the DC braking torque characteristic of the induction motor shown in FIG. 1.

The induction motor 9, however has the torque characteristic due to the DC braking force as shown in FIG. 2. In FIG. 2 the axis of ordinates represents a braking torque and the axis of abscissas represents a rotational speed of the induction motor. As shown in FIG. 2, the induction motor is operated at a rotational speed $\omega_1$ designated by a point A where a braking torque $T_b$ of the induction motor is balanced with an unbalanced load torque $T_l$ resulting from a difference in weight between the elevator car 15 and the counter weight 16. Since that point A is unstable, the command speed instructing device 19 compares the command emergency speed signal from the command emergency speed generator 18 with the actual speed signal for the elevator car 15 resulting from the tachometer generator 17 to deliver a command emergency speed signal to the inverter 9 to cause the latter to effect the feedback control of the motor's speed.

Thus the arrangement of FIG. 1 has had the disadvantages as described above.

Also Japanese laid-open patent application No. 33,174/1982 discloses an elevator control system in which, upon the occurrence of a power failure a contactor connects another DC source, for example, a battery to an inverter such as described above. The cited elevator control system has been disadvantageous in that a regenerated power is returned back to the battery to overcharge the latter resulting in a reduction in lifetime and pairs of contacts disposed in the contactor are apt to be put in bad engagement because the contactor is extremely rarely used.

Figure 3:
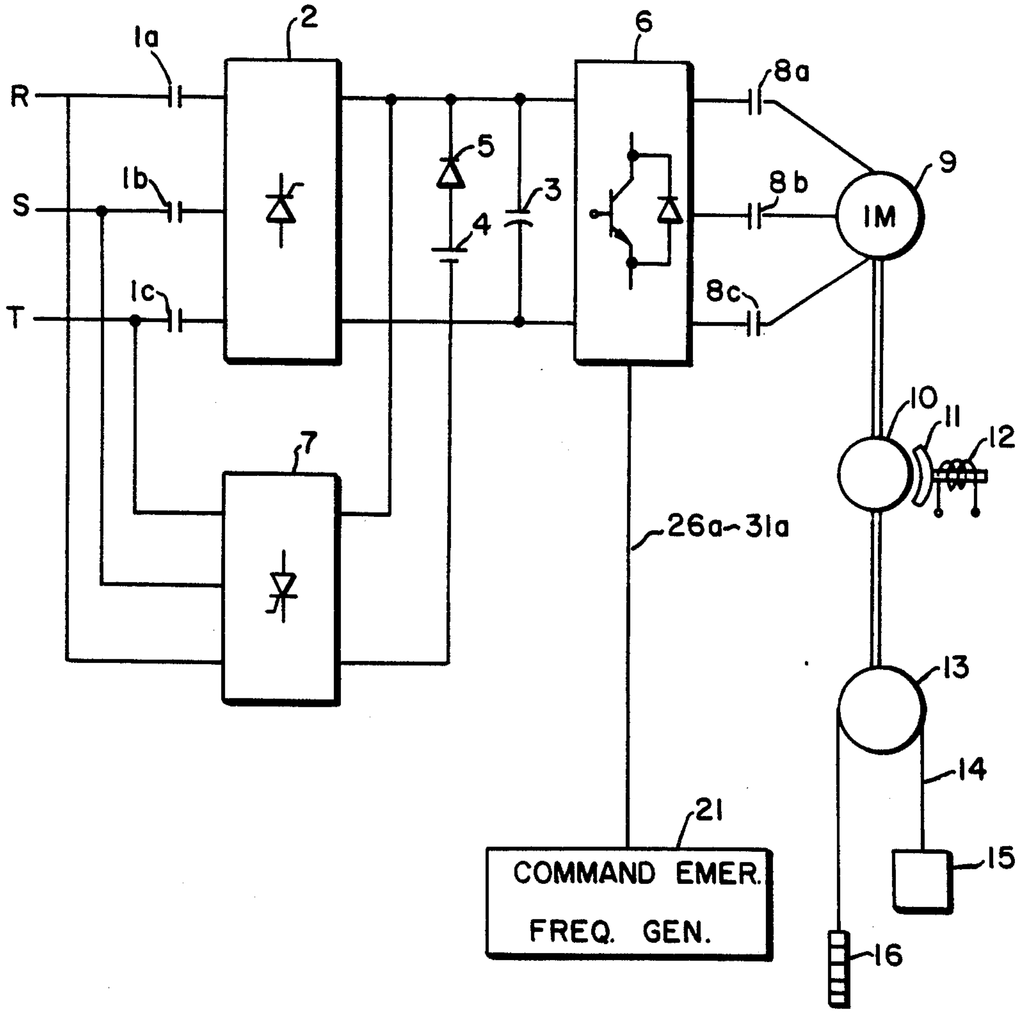
FIG. 3 is a combined circuit and block diagram of one embodiment according to the AC elevator control system of the present invention.
Figure 4:
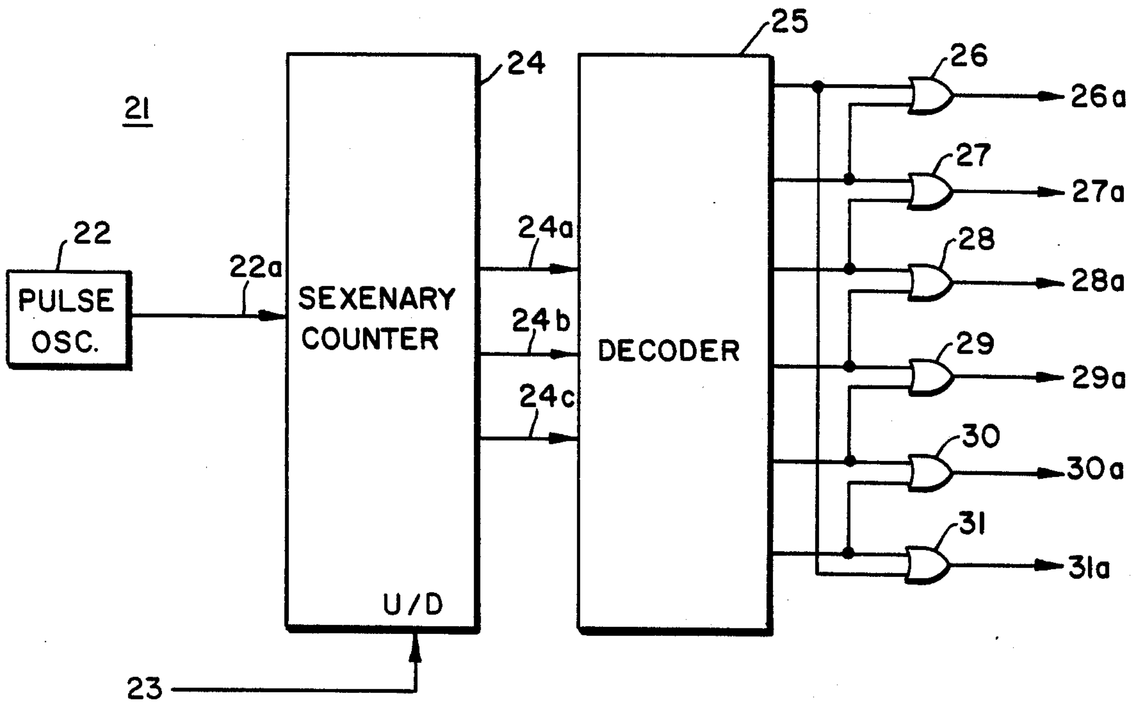
FIG. 4 is a block diagram of the command emergency frequency generator shown in FIG. 3.

Referring now to FIG. 3, there is illustrated one embodiment according to the AC elevator control system of the present invention. The arrangement illustrated is different from that shown in FIG. 1 only in that in FIG. 3 a command emergency frequency generator generally designated by the reference numeral 21 is connected to the inverter 6 with the omission of the tachometer generator 17, the command emergency speed generator 18 and the emergency speed instructing device 19. Upon the occurrence of a power failure or a fault, the command emergency frequency generator 21 is operative to deliver a command emergency frequency signal to the inverter 6 to drive it at a low frequency as predetermined by the command emergency frequency signal, the details thereof are illustrated in FIG. 4. The arrangement illustrated comprises a pulse oscillator 22 for generating a train of clock pulses **22*a* having a constant pulse repetition frequency and a sexenary counter 24 connected to the pulse oscillator 22 and applied with a count direction changing signal 23 having a pair of "H" and "L" levels. The signal 23 at its "H" level causes the counter 24 to add the pulses 22*a* from the pulse oscillator 22 to one another while the signal 23 at its "L" level causes the counter 22 to successively subtract the pulses 22*a* from its count. The sexenary counter 24 counts the pulses 22*a* in the up or down direction and pulse-modulates them to produce three outputs 24*a*, 24*b* and 24*c*. Those outputs are applied to a decoder 25 including six outputs connected to six "OR" gates 26, 27, 28, 29, 30 and 31 respectively so that, assuming that the six "OR" gates are arranged in a circle, each output of the decoder 25 is connected to one input to one of a pair of adjacent gates and also to the other input of the other thereof. For example, a second one of the outputs of the decoder 25 shown under the uppermost output in FIG. 4 is connected to one input to the "OR" gate 27 and also to the other input to the "OR" gate 26 adjacent to the "OR" gate 27. The "OR" gates 26, 27, 28, 29, 30 and 31 produce outputs 26*a*, 27*a*, 28*a*, 29*a*, 30*a* and 31*a*** respectively.

Figure 5:
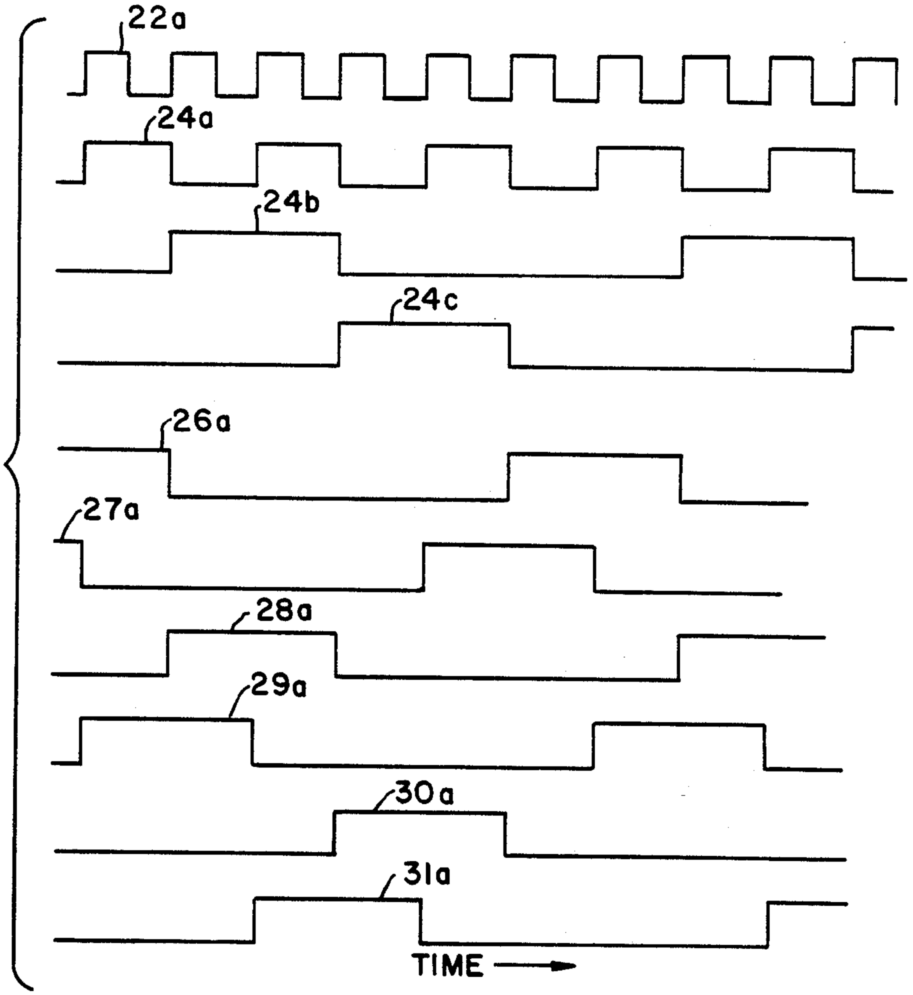
FIG. 5 is a timing chart useful in explaining the operation of the arrangement shown in FIG. 4.

FIG. 5 is a timing chart illustrating waveforms of pulses developed at various points in the arrangement of FIG. 4. The pulse oscillator 22 produces a train of clock pulses **22*a* shown at waveform in the uppermost row and labelled 22*a* in FIG. 5. As shown at waveform 24*a* in a second row in FIG. 5, the output 24*a* from the sexenary counter 24 includes a train of pulses 24*a* each rising at a rise of an every other pulse 22*a* and falling at the rise of the next succeeding pulse 22*a* with a pulse repetition frequency equal to one half that of the pulse 22*a*. The output 24*b* from the counter 24 includes a train of pulses 24*b* each rising at a fall of every third pulse 24*a* and falling at a fall of the next succeeding pulse 24*a* with a pulse repetition frequency equal to one sixth that of the pulse 22*a* or one third that of the pulse 24*b* and the output 24*c* from the counter 24 includes a train of pulses 24*c* each rising at a fall of every fourth pulse 24*a* and falling at a fall of the next succeeding pulse 24*B* with a pulse repetition frequency equal to one sixth that of the pulse 22*a* or to one third that of the pulse 24*a* as will be understood from waveforms shown in upper four rows in FIG. 5**.

The remaining rows show waveforms of the outputs **26*a* through 31*a* from the "OR" gates 26 through 31 or the command emergency frequency generator 21. The outputs or pulses 26*a* through 31*a* have a command pulse repetition frequency equal to one sixth that of the pulse 22*a* and are equal in pulse duration to one another. The output or pulse 26*a* rises at a fall of every third pulse 24*a* and falls at a fall of the next succeeding pulse 24*a*, the output or pulse 27*a* leads the pulse 26*a* by one pulse duration of the pulse 24*a*, and output or pulse 28*a* rises at a fall of each pulse 26*a*. The output or pulse 29*a* lead the pulse 28*a* by one pulse duration of the pulse 24*a*, the output or pulse 30*a* lags behind the pulse 29*a* by one pulse duration of the pulse 24*a* and the output or pulse 31*a* leads the pulse 30*a* by one pulse duration of the pulse 24*a*.**

The outputs or pulses **26*a* through 31*a* from the "OR" gates 26 through 31** forms the command frequency signal.

FIG. 5 shows, by way of example, the various waveforms and it is to be understood that the present invention is restricted to the waveforms illustrated in FIG. 5.

Figure 6:
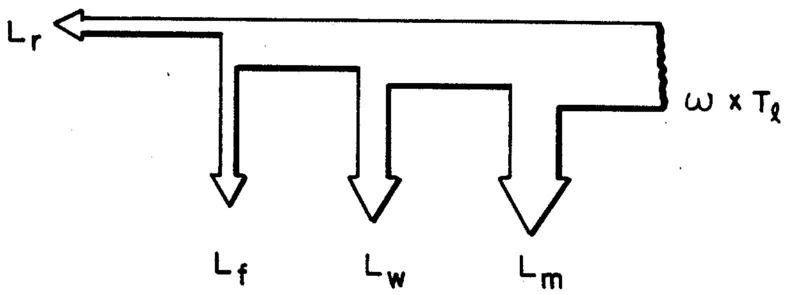
FIG. 6 is a graph useful in explaining an emergency stream through the arrangement shown in FIG. 3.

If the elevator car 15 has been stopped between a pair of adjacent floors of a building served therewith by the occurrence of a power failure or a fault, then the command emergency frequency generator 21 delivers a command frequency consisting of the six outputs or pulses **26*a* through 31*a* as shown in FIG. 5 to the inverter 6 in which the six transistors 6A through 6F are successively operated with the outputs or pulses 26*a* through 31*a* applied to base electrodes thereof whereby the inverter 6 supplies to the induction motor 9 an AC power at a low frequency as determined by the command frequency. Thus the induction motor 9 is rotated in the regenerative mode of operation to cause the combination of the elevator car 15 and the counter weight 16 to travel in the down direction as described above. When the elevator car 15 enter a zone of the nearest floor at which a door can be opened, the same is stopped at that floor. Then an associated door is opened and a passenger or passengers within the elevator car 15 is or are delivered out of the elevator car 15** to that floor through the open door.

Where any induction motor such as the induction motor 9 cause the elevator car to travel at a constant speed while the motor are generally operated in the regenerative braking mode, the resulting energy stream is substantially as shown in FIG. 6. A mechanical input $\omega \times T_l$ (where $\omega$ designates a rotational speed of, for example, the induction motor 9) per unit time is shown in FIG. 6 as having a mechanical loss $L_m$ per unit time, a resistance loss $L_w$ per unit time, and an iron loss $L_f$ subtracted from the same where the mechanical loss is caused from gears and others included in an associated hoist, the resistance loss $L_w$ results from currents flowing through a primary and a secondary winding of the induction motor 9 and the iron loss $L_f$ occurs on an iron core and others of the induction motor 9 in a rotary magnetic field established thereon. In addition there are a loss caused on the inverter, a windage loss etc. Those losses are disregarded for pusposes of simplification. After having subtracted the losses $L_m$, $L_w$ and $L_f$ therefrom the mechanical input $\omega \times T_l$ may have the remainder. At that time the remainder is returned back to the DC side of the inverter 6 as a regenerated power $L_r$ that is also shown in FIG. 6.

Figure 7:
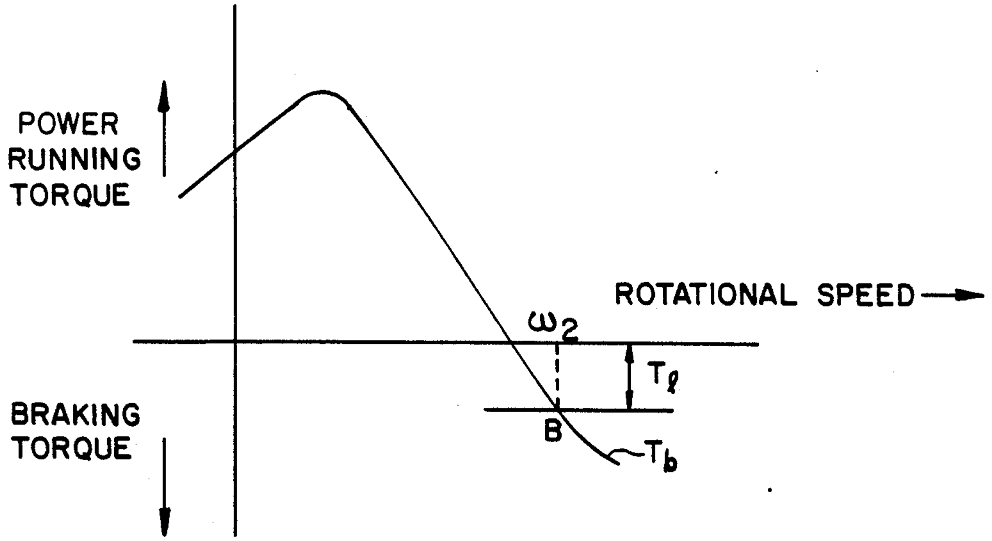
FIG. 7 is a graph illustrating the braking torque characteristic of the induction motor shown in FIG. 3.

Accordingly, a small mechanical input $\omega \times T_l$ per unit time is spent as the losses as described above before it reaches the DC side of the inverter 6 until it is not developed, as a regenerated power on the DC side thereof. Thus if the AC power produced by the inverter 6 decrease in frequency to reduce the rotational speed of the induction motor 9 thereby to cause the elevator car 15 to travel, then no power is regenerated on the DC side of the inverter 6 even in the case of a large difference in weight between the elevator car 15 and the counter weight 16 as during an ascent under non-loading or during a descent under heavy loading. In addition the induction motor has the torque characteristic as shown in FIG. 7 wherein the axis of ordinates represents a power running torque on the positive side thereof and a braking torque on the negative side while the axis of abscissas represents the rotational speed of the induction motor 9. The induction motor 9 is rotated at a constant speed as determined by a rotational speed $\omega_2$ expressed by a point B (see FIG. 7) where a braking torque $T_b$ is balanced with an unbalanced load torque $T_l$. Since the point B is stabilized, it is not necessary to effect the feedback control of the speed of the induction motor 9 and it is required only to impart to the inverter 9 a command for generating a constant frequency by the inverter 9. In other words, the command frequency from the command frequency generator 21 is required only to be set to such a value that the induction motor 9 is rotated at a rotational speed $\omega$ such that $$W \times T_l < L_m + L_w + L_f,$$

where the $T_l$, $L_m$, $L_w$ and $L_f$ are defined as described above and the $T_l$ has preferably a maximum thereof.

From the foregoing it is seen that any regenerated power is not produced in the down direction as described above with the induction motor operated in the regenerative mode. This is true in the case of an up direction with the induction motor operated in the power running mode. It is preferable, however, that upon the occurrence of a power failure or a fault, the elevator car 15 travels in the down direction with the induction motor operated in the regenerative mode. This is because the battery 4 can decrease incapacity with the elevator car 5 traveling in the down direction and the elevator car 15 can sufficiently travel to the nearest floor even with an inter-floor distance long.

From the foregoing it is also seen that, upon the occurrence of a power failure or a fault, the inverter is controlled to produce a low frequency as determined by both a difference in weight between the elevator car and the counter weight and the various losses of the motor driving system and the combination of the elevator car and counter weight is operated at a low speed in a direction to lower a heavier one of the elevator car and the counter weight. Accordingly, the regenerated power can be avoided to be produced and the elevator car can be operated with an inexpensive structure and through the simple control.

While the present invention has been illustrated and described in conjunction with a single preferred embodiment thereof it is to be understood that numerous changes and modifications may be resorted to without departing from the spirit and scope of the present invention.

What is claimed is:

1. An AC elevator control system comprising an elevator car and a counter weight connected to both ends of a traction rope respectively, a sheave over which said traction rope is trained, an induction motor for driving said sheave, a converter for converting an AC power to a direct current, an inverter for inverting said direct current from said converter to an AC power with a variable voltage at a variable frequency to supply said AC power to said induction motor, a battery connected across the DC side of said inverter and forming an electric source for actuating said inverter upon the occurrence of a power failure and/or a fault and a command emergency frequency generator responsive to the occurrence of a power failure or fault for delivering a low frequency command emergency signal to said inverter so as to not generate regenerative power with said inductive motor;

wherein said command emergency frequency signal from said command emergency frequency generator, is set to a value as determined by the relationship between a difference in weight between said elevator car and said counter weight and various losses of a system for driving said induction motor.

2. An AC elevator control system as claimed in claim 1, wherein said command emergency frequency signal from said command emergency frequency generator is set to such a value that said inductor motor rotates at a rotatinal speed $\omega$ such that $$\omega \times T_l < L_m + L_w + L_f$$

where $T_l$ designates an unbalanced load torque due to a difference in weight between said elevator car and said counter weight, $\omega \times T_l$ designates a mechanical input per unit time calculated in terms of a rotary shaft of said induction motor, $L_m$ designates a mechanical loss per unit time occurring on gears and other elements disposed on a hoist, $L_w$ designates a resistance loss per unit time resulting from currents flowing through a primary and a secondary winding of said induction motor, and $L_f$ designates an iron loss per unit time occurring on an iron core and other magnetic elements of said induction motor in a rotary magnetic field established within said induction motor.

3. An AC elevator control system comprising an elevator car and a counter weight connected to both ends of a traction rope respectively, a sheave over which said traction rope is trained, an induction motor for driving said sheave, a converter for converting an AC power to a direct current, an inverter for inverting said direct current from said converter to an AC power with a variable voltage at a variable frequency to supply said AC power to said induction motor, a battery connected across the DC side of said inverter and forming an electric source for actuating said inverter upon the occurrences of a power failure and/or a fault and a command emergency frequency generator responsive to the occurrence of a power failure or fault for delivering a low frequency command emergency signal to said inverter so as to not generate regenerative power with said inductive motor;

wherein said command emergency frequency generator includes a pulse oscillator for generating a train of pulses having a constant pulse repetition frequency, a counter supplied with said train of pulses from said pulse oscillator and a count direction changing signal used to pulse-modulate said pulses supplied thereto, a decoder connected to said counter, and a plurality of "OR" gates a connected to said decoder producing said command emergency frequency signal;

and wherein said command emergency frequency signal from said command emergency frequency generator, is set to a value as determined by the relationship between a difference in weight between said elevator car and said counter weight and various losses of a system for driving said induction motor.

4. An AC elevator control system as claimed in claim 3, wherein said command emergency frequency signal from said command emergency frequency generator is set to such a value that said inductor motor rotates at a rotational speed $\omega$ such that $$\omega \times T_l < L_m + L_w + L_f$$

where $T_l$ designates an unbalanced load torque due to a difference in weight between said elevator car and said counter weight, $\omega \times T_l$ designates a mechanical input per unit time calculated in terms of a rotary shaft of said induction motor, $L_m$ a mechanical loss per unit time occurring on gears and others disposed on a hoist, $L_w$ a resistance loss per unit time resulting from currents flowing through a primary and secondary winding of said induction motor, and $L_f$ designates an iron loss per unit time occurring on an iron core and others of said induction motor in a rotary magnetic field established on said induction motor.

* * * * *